United States Patent [19]

Lubbs

[11] Patent Number: 4,626,286
[45] Date of Patent: Dec. 2, 1986

[54] COLLAGEN GEL AND THE PROCESS OF MAKING SAID GEL

[75] Inventor: Eugene K. Lubbs, Milford, N.J.

[73] Assignee: Schmid Laboratories, Inc., Little Falls, N.J.

[21] Appl. No.: 716,521

[22] Filed: Mar. 27, 1985

Related U.S. Application Data

[63] Continuation of Ser. No. 546,963, Oct. 31, 1983, abandoned.

[51] Int. Cl.$^4$ .............................................. C08L 89/00
[52] U.S. Cl. .................................... 106/157; 106/124; 106/161; 128/132 R; 128/DIG. 8
[58] Field of Search ............... 106/124, 161, 157, 155; 128/132 R

[56] References Cited

U.S. PATENT DOCUMENTS

| | | | |
|---|---|---|---|
| 2,371,883 | 3/1945 | Gammeter | 128/463 |
| 2,920,000 | 1/1960 | Hochstadt et al. | 260/123.7 |
| 3,551,535 | 12/1964 | Henderson et al. | 106/157 |
| 4,055,467 | 10/1977 | Christensen | 435/264 |
| 4,233,360 | 11/1980 | Luck et al. | 428/310 |
| 4,349,026 | 9/1982 | Miyata | 128/132 |
| 4,406,853 | 9/1983 | Miyata | 264/304 |

OTHER PUBLICATIONS

Kirk-Othmer-Encyclopedia of Chemical Technology, vol. 8, pp. 186, 187, 1966.

Primary Examiner—Theodore Morris
Attorney, Agent, or Firm—Darby & Darby

[57] ABSTRACT

The present invention relates to a collagen gel and to a process for obtaining it. More particularly, the present invention relates to an improved homogeneous collagen gel, which can be used in the manufacture of collagen film articles of improved thinness, smoothness, superior strength, and superior homogeneity, and to a process for obtaining the improved gel.

32 Claims, 3 Drawing Figures

COLLAGEN GEL AND THE PROCESS OF MAKING SAID GEL

This is a continuation of application Ser. No. 546,963, filed Oct. 31, 1983, now abandoned.

The present invention relates to a collagen gel and to a process for obtaining it, to film articles made therefrom and to a process for making said articles. More particularly, the present invention relates to an improved homogeneous collagen gel, which can be used in the manufacture of collagen film articles of improved thinness and smoothness, superior strength, and superior homogeneity, to a process for obtaining the improved gel, and to film articles made therefrom and possessing the above-described superior properties. Articles encompassed by the present invention include but are not limited to condoms, vaginal diaphragms, surgical gloves, films, permeable membranes, tubing, etc.

In the prior art, such film articles were made from natural rubber, synthetic elastomers or lamb cecum. Natural rubber and synthetic elastomers yield films of generally satisfactory strength and thinness and can be produced at a relatively moderate cost, but are unsatisfactory because they inhibit sensitivity they are completely water impermeable, and they are ineffective heat conductors.

Ceca are naturally thin membranes resulting in articles of rather satisfactory strength and, in contrast with natural and synthetic elastomers, increased sensitivity and gas permeability. However, ceca are limited in quantity and expensive to prepare. In addition, ceca have an unpleasant appearance as they cannot be freed of "veins", i.e., surface irregularities remaining after removal of fatty or muscle tissue.

Collagen gels of the prior art were rheologically non-homogeneous and contaminated with ligamentous particles. Very thin, smooth films with uniform strength were difficult to prepare from these gels and were unsuitable for many of the above mentioned uses.

One such collagen product was a condom which appeared in the market in Japan approximately fourteen years ago under the trademark "Koragen". This product was relatively crude, unattractive in appearance and feel and low in strength. Consequently, it was completely displaced by the latex product and has disappeared from the market. The manufacturing company has failed and attempts by applicant's assignee to acquire more information on the nature of the "Koragen" process and the type of collagen employed proved futile.

U.S. Pat. No. 4,349,026 (issued on Sept. 14, 1982) to Miyata discloses a collagen condom product and a method for making it. The present invention is an improvement on the subject matter of this patent.

Miyata discloses a collagen condom made preferably from the achilles tendon of young animals. Unfortunately, achilles tendon is not commercially available as it is usually left on the animal carcass through the meat retail stage. In addition, the collagen treatment disclosed by Miyata results in a collagen film that is not sufficiently strong and cannot be economically used in large scale production of condoms or other film articles.

OBJECTS OF THE INVENTION

Accordingly, it is an object of this invention to provide a collagen gel of superior homogeneity which may be used in the manufacture of collagen film having superior strength, and improved homogeneity, thinness and smoothness and which is suitable for the manufacture of thin film articles.

It is another object of this invention to provide a method for making such a gel using animal tendon as the raw material.

It is yet another object of this invention to provide a thin collagen film article, such as a condom, having superior breaking and tear strength, improved homogeneity, thinness, smoothness, sensitivity and appearance and being convenient and economical to manufacture.

It is still another object of the present invention to provide a method for making such a collagen film article.

These and other objects of the present invention will be apparent to one skilled in the art in light of the following description, accompanying drawings and appended claims.

SUMMARY OF THE INVENTION

A method of making collagen gel suitable for use in the manufacture of thin collagen film articles having superior mechanical properties comprising:

(a) providing clean frozen animal tendon containing at least 30% collagen and free of ligamentous tissue;

(b) grinding said tendon and passing it through a colloid mill in the presence of about 91–93% water and about 0.1 to 0.5% enzyme based on collagen solids to form a collagen slurry;

(c) allowing said enzyme containing slurry to stand at room temperature for a time sufficient to break up (digest) elastin and other noncollagenous matter while leaving the collagen structure substantially intact;

(d) swelling the slurry with an acid selected from the group consisting of lactic acid, maleic acid, succinic acid, malic acid, oxalic acid and tartaric acid to form a swollen collagen suspension;

(e) homogenizing and deaerating said suspension to form a collagen gel.

Another aspect of the present invention relates to a gel made by the above method.

Yet another aspect of the present invention relates to a method for making film using the above gel, said method comprising:

(a) forming a film by applying at least one coat of said gel onto a substrate surface;

(b) drying said film at 65°–95° C.;

(c) neutralizing and coagulating said film in an alkaline solution 0.14–1.3N in hydroxyl ion for about 30 sec. to about 5 min.;

(d) washing said film with water;

(e) tanning said film in a tanning solution containing 0.05–1.0% based on weight of an aldehyde selected from the group consisting of formaldehyde, glutaraldehyde and glyoxal, for about 30 sec. to 5 min.;

(f) removing excess tanning solution by washing; and (g) removing said film from said substrate.

Alternatively, the film can be formed by adding starch to the gel in an amount up to about 100% by weight based on the collagen solids, forming the film as above, drying at 65°–95° C. for a time sufficient for crosslinking to take place, washing the film as above with or without tanning and removing the film from the substrate.

A further aspect of the present invention relates to a collagen film article made by using the above film-making method.

DETAILED DESCRIPTION OF THE INVENTION

The collagen raw material for the present invention should have a high collagen content (preferably at least about 30-45%), should be relatively free of ligamentous tissue which is resistant to swelling, and should yield a homogeneous and easily processable collagen gel. In addition, it should be readily available on a large scale and economically recoverable and processable. A suitable source of collagen for the present invention is animal tendon. Preferred, is tendon from higher animals such as cattle, sheep, pigs, etc. and especially preferred are bovine digital flexor tendons. Achilles and other tendons would also be suitable, but they are not commercially available. Hide collagen from limed tannery split is also suitable but the economics of limed split processing are unattractive. Pig skin or lamb skin collagen is also expected to be appropriate, but it has not been tested because it is not readily available and its processing is costly.

Figure 1:
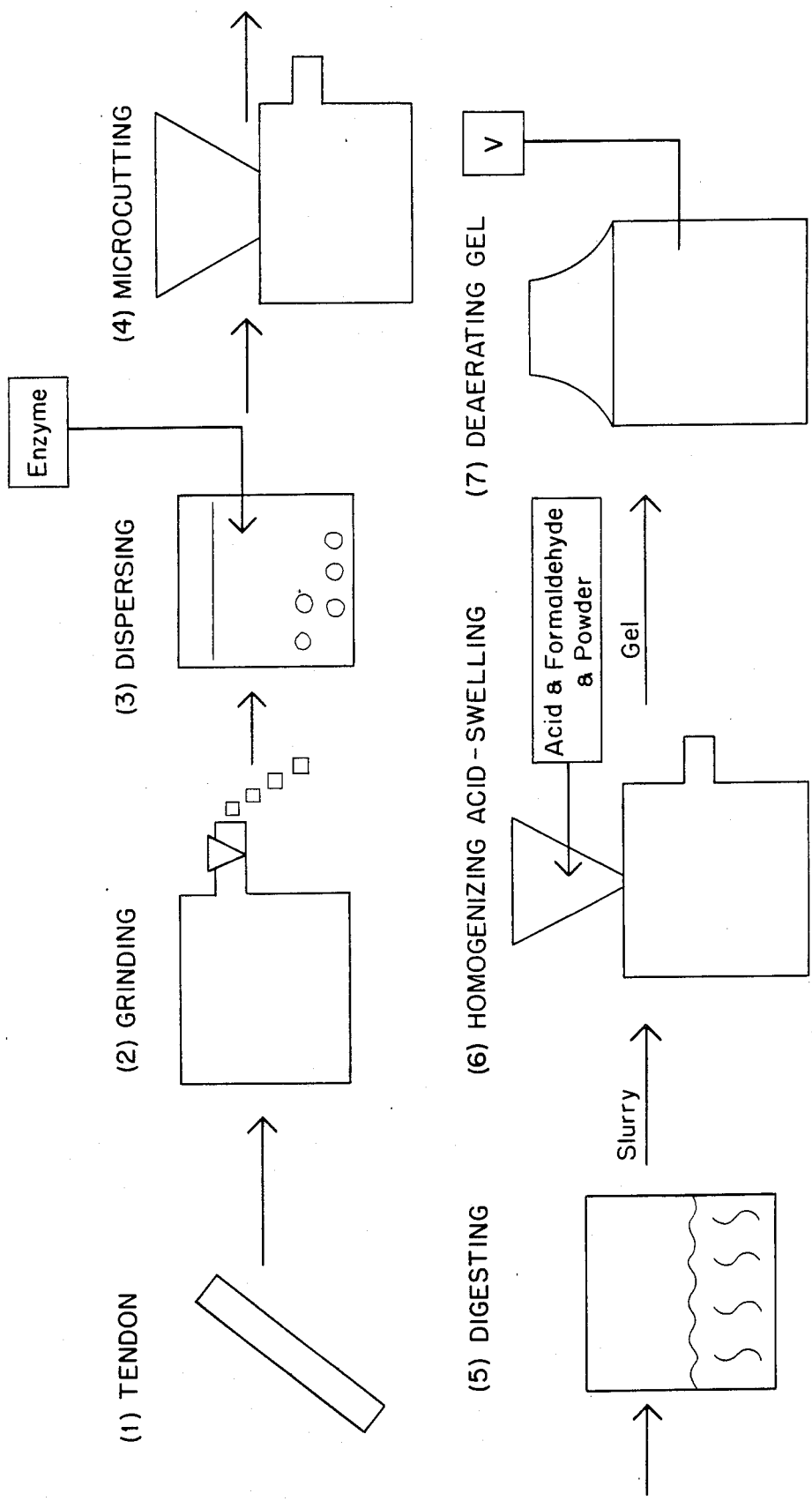
FIG. 1 is a schematic diagram of a process for making collagen gel from tendon material.

According to a preferred embodiment of the present invention, as illustrated in FIG. 1, bovine digital flexor tendons, 1, are cleaned, frozen and then ground in an ordinary commercial grinder such as "Butcher Boy",[1] 2, to suitable size pieces (usually 3/16-⅜ in.). Ground tendon is dispersed in water (to which Rhozyme-41 has been added) and comminuted in a microcutter, 4, (such as a "Stephan" machine, manufactured in West Germany by A. Stephan U Sohne, GmbH).

[1] Model TCA-32, manufactured by Lasar Mfg. Co., Inc., Los Angeles, Calif.

Grinding and comminution are two steps of a process designed to break up collagen material into fiber bundles and eventually individual fibrils, which can be acid-swollen to yield a homogeneous gel. One pass through the microcutter is sufficient. More than one pass at this stage, adversely affects strength. The blade spacing of the microcutter also affects strength of the final product. Generally, the closer the blade spacing, the higher the strength. The preferred minimum spacing is 1 mm. Closer spacing (i.e. less than 1 mm) results in reduced throughput and increases the risk of overheating, while wider spacing (e.g. 1.5 mm and over) results in reduced strength. Microcutting may be postponed until after acidification, but if conducted before, a more homogeneous gel results.

Rhozyme-41 is a proteolytic enzyme derived from *Aspergillus oryzae* which is advantageously used to break down elastin, which surrounds collagen fibrils and binds them together, as well as other non-collagenous components, the presence of which weakens strength of the final product. The enzyme effectively eliminates such undesirable components while leaving collagen fibrils substantially intact for maximum strength results. Rhozyme-41 (manufactured by Corning Glass Biochemicals, a division of Corning Glass, Inc., Corning, N.Y.), is particularly preferred as it does not require use of either an activator such as cysteine, or an inactivator such as peroxide, and it results in fabricated collagen film articles with tensile strength superior to that of naturally occurring collagen films and superior to that of collagen film articles or films produced using other enzymes, such as pancreatin, ficin, etc. Rhozyme 41 is used in an amount ranging between about 0.1 and 0.5% on the basis of dry collagen solids in the slurry. Enzyme treatment, (digestion), 5 may last from about 3 to about 24 hours at room temperature with 15-18 hrs. being most preferred. Longer treatment times are possible, but unnecessary. Ordinary room temperature variations during Rhozyme treatment do not affect strength values. Blending, by e.g. passing the enzyme-containing slurry once through the microcutter, 4, disperses the enzyme uniformly and facilitates enzyme action. Enzyme deactivation, the end of the enzyme treatment, is not necessary when using Rhozyme 41, but may be accomplished, if desired, by addition of hydrogen peroxide in an amount at least sufficient to deactivate the enzyme, followed by stirring. Slightly higher peroxide amounts are acceptable but unnecessary. 16.5% $H_2O_2$ on a dry collagen solid basis is preferred. After addition of peroxide and stirring, the suspension is allowed to stand, preferably for approximately 45 minutes.

The enzyme-treated slurry is ready for acid swelling, 6. Choice of the acid affects the degree of swelling and the strength of the ultimate product. Most preferred are lactic and maleic acids, but other organic acids such as succinic acid, oxalic acid, malic acid and tartaric acid may be used with satisfactory results. Inorganic acids such as HCl and $H_3PO_4$ impart less swelling and reduced viscosity and produce lower strength causing the film to split during drying. Other properties, such as odor and toxicity may affect choice of the acid depending on the end use of the collagen film or article. Cost is also a factor to be considered.

A sufficient quantity of acid is added to the slurry to lower the pH to about 3 for maximum tensile strength. Lowering the pH to about 2 increases cost because more acid is used, causes the film to adhere to substrates and presents a problem during film forming. A pH higher than about 3 fails to accomplish sufficient swelling. Accordingly, a pH of about 3 is preferred. When lactic acid is used, the preferred amount is 82% by weight on a dry collagen solids basis.

Strength of the final product is further enhanced if a small amount of aldehyde is added to the slurry during acid addition to effect partial cross-linking of the collagen. Formaldehyde is preferred over glutaraldehyde and glyoxal. A preferred amount is 0.36% formaldehyde based on dry collagen solids.

After acid swelling, bundles of collagen fibers are still present in the gel. At this point, one pass through a microcutter with a blade clearance of 1 mm is useful to disrupt the remaining fiber bundles, and thus to blend and homogenize the gel. Both the acid and the formaldehyde are preferably added to the slurry at the point of its introduction into the microcutter 6. The resulting gel is further homogenized and dearated by mixing, 7, in e.g., a Ross planetary mixer[1] under vacuum. At the end of this step, the gel is ready for film and article formation. At this point the gel preferably contains about 0.95 to 1.3% total solids, most preferably, about 1.2% solids. Preferred gel viscosity is about 1300 to about 3000 cps, most preferably 1200 cps, for dipping, and higher for extrusion.

[1] Model No. LDM-4 manufactured by Charles Ross & Son Co., Hauppauge, N.Y.

Set forth in the following Table is a comparison of the mechanical properties of two films made from gel. The first was made from a gel containing 0.95% collagen (based on dry weight of tendon) while the second was made from a gel containing 1.2% collagen.

TABLE

|  | Gel 1 | Gel 2 |
|---|---|---|
| Tendon (37% solids) | 291 g | 368 g |
| Rhozyme-41 | 0.108 g | 0.136 g |
| formaldehyde | 0.83 ml | 1.04 ml |
| lactic acid | 54 ml | 68 ml |
| total solids of gel | 1.15% | 1.47% |
| pH | 2.7 | 2.7 |
| viscosity | 1320 cps | 2660 cps |
|  | Film 1 | Film 2 |
| Wet thickness (microns) | 39 | 107 |
| elongation | 43.9% | 54.1% |
| Wet breaking strength | 2.15 Kg | 2.93 Kg |

The above-described process results in preparation of a clear gel, which can be formed into a transparent film, as described below. However, in another preferred embodiment, the present invention also contemplates modification of the clear gel to yield a translucent film which is as strong as or stronger than the film prepared with the clear gel, skin-like in appearance, and which can be made slightly thicker, as is often desirable, without increasing processing costs.

Increasing thickness by applying more coats to form the film is economically unattractive. Increasing thickness by increasing gel solid content is prohibitive because of viscosity constraints. However, it has been further unexpectedly discovered that addition of a small amount of starch (preferably corn starch, but other starch powders or talc may also be used) in powder form affords the following benefits:

1. Film thickness may be increased, if desired, without increasing the number of gel coats (the increase in thickness is proportional to starch content).
2. Viscosity of the gel is substantially unaffected even after addition of relatively large amounts of starch (up to about at least 100% by weight based on collagen solids in the gel). Accordingly, film formation is not inhibited.
3. The gel becomes translucent (instead of transparent) and acquires a skin-like feel and appearance. This is particularly desirable when manufacturing condoms.
4. Strength of the film increases after addition of about 60% or more starch as compared to that of a clear film of the same thickness. Strength increase of about 15% has been observed.
5. Film flexibility, softness and elasticity is improved even at low moisture levels, as starch functions as a humectant.
6. Article forming is facilitated due to improved releasability of the film from the surface of the substrate on which it is formed.
7. Raw material and processing costs are reduced. The unit cost of corn starch is about 10% that of collagen solids. Moreover, less expensive equipment such as molds or substrates for film formation may be used because of the improved flexibility, elasticity and releasability of the film.

The process for making gel that will result in translucent film is the same as that for making gel that will result in clear film through the Rhozyme digestion step. After digestion, a starch suspension to which the required amounts of formaldehyde and lactic acid have been added is mixed into the enzyme digested collagen dispersion. The resulting mixture contains about 20-100% of starch by weight based on the collagen solids content of the slurry and most preferably about 60% of starch.

Figure 2:
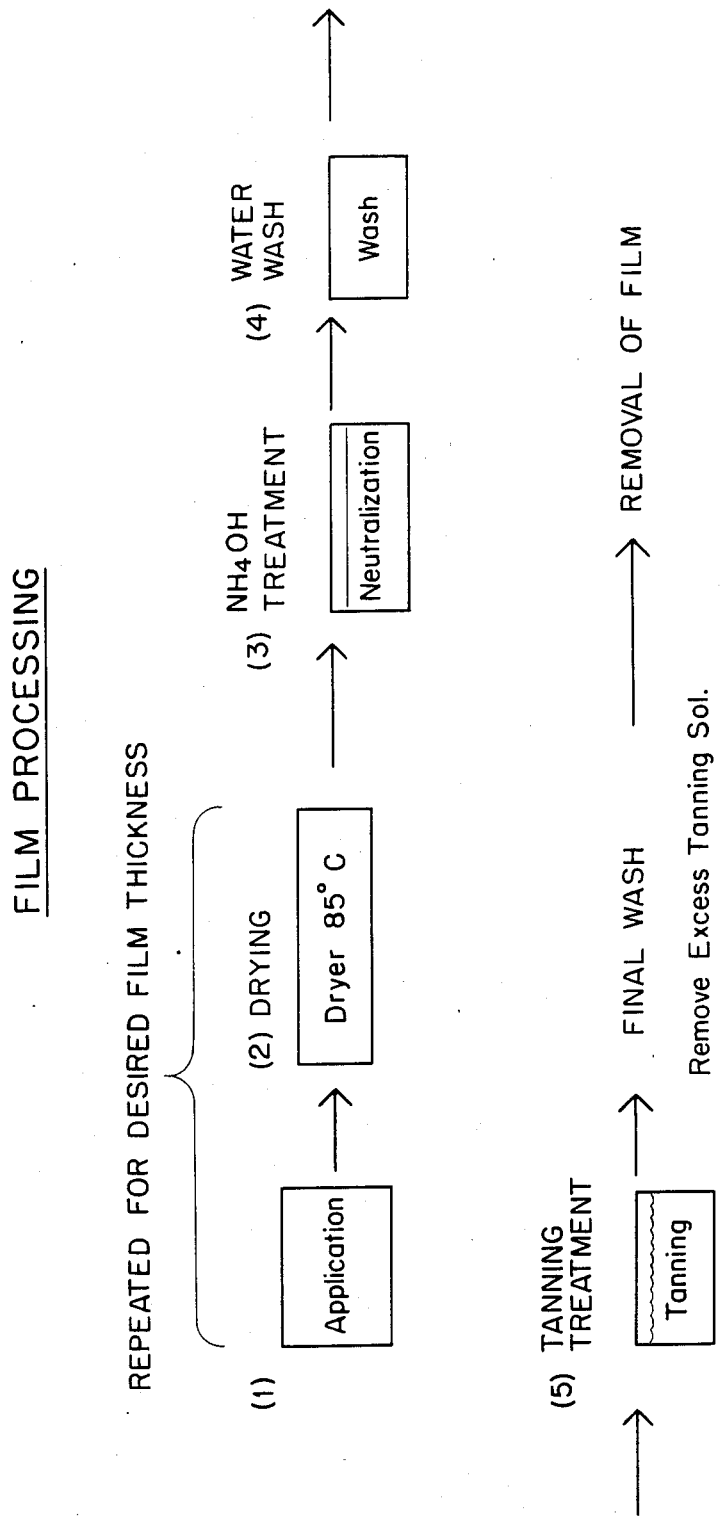
FIG. 2 is a schematic diagram of a process for making a collagen film article from collagen gel.

Film formation according to a preferred embodiment of the present invention, as illustrated in FIG. 2, takes place as follows:

A thin layer of film is formed by applying, 21, at least one coat of gel on a substrate surface. The substrate may be a mold such as a mandrel which may be dipped in the collagen gel. Film thickness is controlled by the viscosity and solids content of the gel, and the number of such dippings or coats.

The thus formed film is subsequently dried in air, 22 at about 65°-95° C. and preferably at about 85° C. Most preferably, a four coat film is dried after the deposition of each of the first two coats 31, at which time a retaining elastic band 32, is placed on the film at the upper part of the mandrel 33 (See FIG. 3). Over the first two coats (and the elastic band) each of two additional coats is deposited and dried. After drying of the fourth coat and the remaining process steps (described below) are completed, the film including the band may simply be rolled off the mandrel.

When a tubular article, such as a condom is formed from clear gel, the following method is used.

Figure 3:
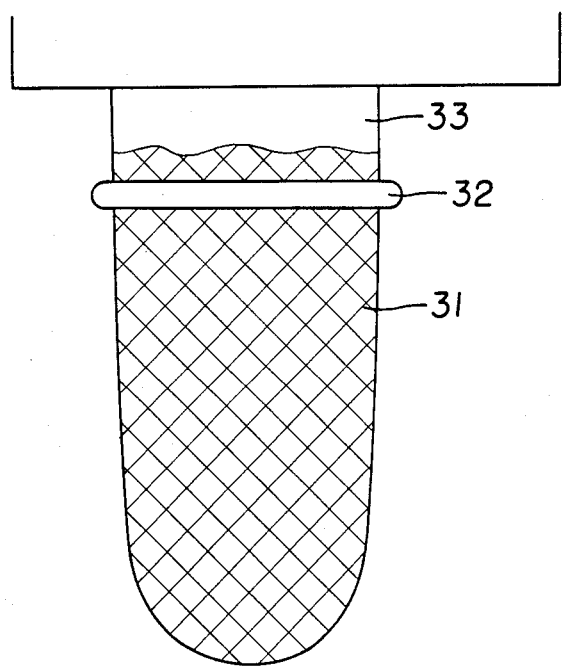
FIG. 3 is a schematic diagram of a process for making a tubular film article such as a condom.

A mandrel is used as a mold. The mandrel is preferably made from an acrylic polymer (such as plexiglass) and has a tapered cylindrical shape (as shown in FIG. 3). The mandrel is dipped in the gel and air dried repeatedly as many times as desired. Each dipping causes deposition of a thin coat of gel on the mandrel or on the previously deposited coat. Four coats of clear gel of the most preferred composition described above are sufficient to produce a film 30-35 microns thick, which is the preferred thickness for a condom of this type. Slow rotation of the mandrel during dipping serves to orient the film. The mandrel is preferably rotated in opposite directions during each of successive dippings. The rotation of the mandrel is preferably adjusted so as to produce a film of about 20% more strength in the longitudinal (as compared to the transverse) direction, i.e. in the direction parallel to the mandrel axis. When using the most preferred ingredient amounts and method parameters for the gel, the preferred mandrel rate of rotation ranges between about 0.4 and 0.8 times most preferably 0.63 times the rate at which the mandrel is withdrawn from the gel.

The finally dried film is neutralized 23, by soaking the film gel in an alkaline bath such as a 0.14-1.3N ammonium hydroxide bath (preferably 0.71% NH4OH) for 30 sec.-5 min., preferably 1.5 min. Hydroxides of alkali metals such as sodium or potassium may also be used but NH4OH is preferred for its ease of removal from the film. Thereafter, the neutralized film is rinsed with water, 24.

The rinsed film is tanned for about 30 sec.-5 min., preferably for 30 sec., in a tanning solution, 25, containing 0.05-1.0% (at a pH 6.9-4.5) and preferably 0.1% (at a pH of 6.8) glutaraldehyde mainly to enhance film and stability, and to facilitate separation of the film from the mandrel. The duration of the tanning step should be kept to a minimum as overtanning will make the film brittle. Instead of glutaraldehyde, it is possible to use formaldehyde or glyoxal. Other tanning agents, such as reducing sugars, chromium salts or vegetable tannins may also be used, but they produce lower tensile strengths, and may be unsuitable for some applications of the present invention. The excess tanning solution is removed by rinsing in water and the thus prepared film is removed from the mandrel or other substrate.

When a condom is made from translucent (starch-containing gel), the procedure is generally the same as above, except that, if a mandrel is used, a less expensive tapered glass mandrel may be substituted for the acrylic one. In addition, tanning is unnecessary. Thus the dried film is neutralized as in the transparent film case, and afterwards it is washed and removed from the mandrel. Four coats of gel are also preferred. If the gel contains 60% starch, as is preferred, a final film thickness of 55±5 microns will result.

The following examples serve to further illustrate the present invention but not to limit its scope.

EXAMPLE 1

Bovine digital flexor tendon was ground through a plate with 3/16" diameter holes. The coarsely ground tendon contained 42.4% solids. A 0.308 Kg portion of the ground tendon was dispersed into 11.05 Kg water at 15° C., to which had been added 0.131 g Rhozyme-41. The total dispersion was passed once through a Stephan Microcutter with a 1 mm blade clearance. The comminuted mass was allowed to stand at room temperature to allow the enzyme to work. After 17 hours, 70 ml of lactic acid containing 1 ml 37% formaldehyde were stirred into the enzyme treated slurry. The acidified mass was passed once through the Microcutter to enhance swelling and to homogenize the resultant gel. The homogenized gel was transferred to a Ross planetary mixer and stirred under vacuum for 20 minutes to remove entrained air. The gel had a solids content of 1.35% and a viscosity of 1192 cps.

Four coats of gel were applied to a mandrel by dipping into the gel and drying four times. The direction of mandrel rotation was changed for each dip. Each gel coat was dried for 15 minutes in a moving stream of air at 85° C. After the fourth coat was dried the mandrel was successively treated with a 0.71N NH$_4$OH solution at pH 11.6 for 1.5 minutes, then water for 30 seconds, followed by a 0.1% aqueous glutaraldyhyde solution at pH 6.8 for 30 seconds then rinsed with water. The wet film was easily stripped from the mandrel. The wet film was 36 microns thick and had a breaking strength of 2.73 Kg.

EXAMPLE 2

367 g of 35.48% solids tendon was dispersed into 7.20 Kg H$_2$O containing 0.131 g Rhozyme-41. The dispersion was comminuted and digested as in Example 1. Then 3.64 Kg. H$_2$O containing 26.1 g starch, 1 ml formaldehyde and 65 ml lactic acid was stirred into the digested slurry, and the acidified slurry was passed once through the Microcutter then deaerated. The resulting gel had a solids content of 1.51% and viscosity of 1278 cps. A film made as in Example 1, had a wet thickness of 47 microns and a wet breaking strength of 2.41 kg.

EXAMPLE 3

A gel was made exactly as in Example 2 except that 130.5 g of starch were used. The resulting gel had a solids content of 2.69%, and viscosity of 1212 cps. Film made as in Example 1 had a wet thickness of 65 microns and breaking strength of 2.23 Kg.

EXAMPLE 4

355 g of tendon containing 36.73% solids were used to make a gel as in Example 3. The gel had a solids content of 2.07%, and viscosity of 1390 cps.

Films were made as in Example 3 except that the dried films were not treated with ammonium hydroxide and glutaraldehyde. Instead the dried films were washed with water for 30 minutes, and then removed from the mandrels. The wet film was 47 microns thick and had a breaking strength of 1.70 Kg.

EXAMPLE 5

A gel as in Example 4, except that after addition of the lactic acid, starch, formaldehyde mixture the acidified slurry was allowed to age 24 hours at 4° C. before microcutting and deaeration. The gel contained 2.02% solids and had a viscosity of 1194 cps. Films made from this gel as in Example 4, had wet thickness of 52 microns and breaking strength of 2.26 Kg.

EXAMPLE 6

A gel was made as in Example 5. It contained 1.98% solids and its viscosity was 970 cps. Films were made as in Example 3, except that the glutaraldehyde treatment was omitted. The wet film was 52 microns thick and had a breaking strength of 2.31 Kg.

What is claimed is:

1. A method of making collagen gel for use in the manufacture of thin collagen film article shaving superior mechanical properties comprising:
    comminuting clean animal tendon containing at least 30% collagen essentially free of ligamentous tissue in the presence of about 65% water by weight to form a collagen slurry;
    treating said slurry with about 0.1–0.5% by weight of proteolytic enzyme derived from *Aspergillus oryzae* which effectively digests elastin and other non-collagenous matter contained in said tendon while leaving the collagen structure of said tendon substantially intact, said percentage being based on the collagen solids content of said slurry;
    swelling the slurry with an acid selected from the group consisting of lactic acid, maleic acid, succinic acid, malic acid, oxalic acid, and tartaric acid to form a swollen collagen suspension;
    homogenizing and deaerating said suspension to form a collagen gel.

2. The method of claim 1 wherein said enzyme is Rhozyme-31.

3. A method according to claim 2 wherein said microcomputer blade spacing is 0.5 to 1.5 mm.

4. A method according to claim 2 wherein the duration of said enzyme treatment ranges between about 3 and about 24 hours.

5. A method according to claim 2, wherein said acid is selected from the group consisting of lactic acid and maleic acid.

6. A method according to claim 2, wherein said slurry is also homogenized by processing through a microcutter upon addition of said Rhozyme.

7. A method according to claim 2, wherein said swollen collagen suspension is homogenized by processing through a microcutter prior to deaeration.

8. A method according to claim 2, wherein said deaeration takes place while mixing the suspension in a mechanical mixer under vacuum.

9. A method according to claim 2, wherein a small amount of formaldehyde is also added to the slurry, at substantially the same time as the addition of said acid therein, to effect partial cross-linking of the collagen molecules.

10. A method according to claim 9 wherein said formaldehyde is added in an amount ranging between 0.3 and 0.4% based on dry solid content of said slurry.

11. A method according to claim 2, wherein said tendon is bovine digital flexor tendon, said microcutter blade spacing in step (b) is 1 mm., said Rhozyme −41 treatment duration is 15 to 18 hours, said Rhozyme −41 amount is 0.5%, and said acid is lactic acid added in an amount of 50% based on the weight of collagen solids; said method further comprising addition of 0.36% formaldehyde substantially simultaneously with said acid addition, and homogenizing said slurry after said Rhozyme addition and said collagen suspension by processing through said microcutter, after acid swelling.

12. A method according to claim 1 wherein after said enzyme digestion an amount of powder selected from the group consisting of starch powder and talc powder is mixed into said slurry in an amount such that the resulting slurry contains between 20 and 100% by weight of said powder based on the slurry collagen solids content.

13. A method according to claim 12 wherein said tendon is bovine digital flexor tendon.

14. A method according to claim 12 wherein said microcutter blade spacing is 0.5 to 1.5 mm.

15. A method according to claim 12 wherein the duration of said enzyme treatment ranges between about 3 and 24 hours.

16. A method according to claim 12, wherein said acid is selected from the group consisting of lactic acid and maleic acid.

17. A method according to claim 12, wherein said slurry is also homogenized by processing through a microcutter upon addition of said Rhozyme.

18. A method according to claim 12, wherein said swollen collagen suspension is also homogenized by processing through a microcutter prior to deaeration.

19. A method according to claim 12, wherein said deaeration takes place while mixing the suspension in a mechanical mixer under vacuum.

20. A method according to claim 12, wherein a small amount of formaldehyde is also added to the slurry, at substantially the same time as the addition of said acid therein, to effect partial cross-linking of the collagen molecules.

21. A method according to claim 20 wherein said formaldehyde is added in an amount ranging between 0.3 and 0.40% based on dry solid content of said slurry.

22. A method according to claim 12, wherein said tendon is bovine digital flexor tendon, said microcutter blade spacing in step (b) is 1 mm., said Rhozyme −41 treatment duration is 15 to 18 hours, said Rhozyme −41 amount is 0.5%, and said acid is lactic acid added in an amount of 50% based on weight of collagen solids; said method further comprising addition of 0.36% formaldehyde substantially simultaneously with said acid addition, and homogenizing said slurry after said Rhozyme addition and said acid-swollen collagen suspension by processing through said microcutter.

23. A method according to claim 12 wherein said powder is mixed into said slurry in the form of an aqueous dispersion at the beginning of said acid-swelling step, said dispersion also containing dissolved therein said acid used during said acid-swelling step.

24. A method according to claim 20 wherein said powder is mixed into said slurry in the form of an aqueous dispersion at the beginning of said acid-swelling step said dispersion having dissolved therein said acid and said formaldehyde used during said acid-swelling step.

25. A method according to claim 12 wherein said powder is corn starch powder.

26. A method according to claim 12 wherein the amount of said powder mixed in said slurry is 60% by weight based on collagen solids in said slurry.

27. A method according to claim 22 wherein said powder is corn starch powder and is mixed into said slurry in the form of an aqueous dispersion containing dissolved therein said lactic acid and said formaldehyde and wherein the amount of said corn starch mixed in said slurry is 60% by weight based on the collagen solids in said slurry.

28. A collagen in accordance with the method of claim 2.

29. A collagen gel according to claim 28 having a viscosity ranging between about 1000 and about 3000 cps.

30. A film article made from the gel of claim 28 by a process comprising the steps of:
forming a film by applying at least one coat of said gel onto a substrate surface;
drying said film at a temperature in the range of about 65° to about 95° C.;
neutralizing and coagulating said film in an alkaline solution containing from about 0.14 to about 1.3N of hydroxyl ion for a time in the range of about 30 seconds to about 5 minutes;
washing said film with water; and
removing said film from said substrate.

31. The film article of claim 30, said article being a condom.

32. A method according to claim 2 wherein said tendon is bovine digital flexor tendon.

* * * * *